United States Patent [19]
Loeffler

[11] Patent Number: 5,656,764
[45] Date of Patent: Aug. 12, 1997

[54] MOBILE SPEEDOMETER TESTER

[76] Inventor: Paul L. Loeffler, 1508 Monroe Dr., Edgewater, Fla. 32132

[21] Appl. No.: 449,346

[22] Filed: May 24, 1995

[51] Int. Cl.⁶ .................. G01L 5/00; G01P 21/00
[52] U.S. Cl. .................. 73/1.37; 73/117; 73/123
[58] Field of Search .................. 73/2, 117, 123

[56] References Cited

U.S. PATENT DOCUMENTS

| | | | |
|---|---|---|---|
| 2,607,212 | 4/1952 | Rose. | |
| 2,781,659 | 2/1957 | Parker. | |
| 3,178,927 | 4/1965 | MacMillan | 73/2 |
| 3,435,657 | 4/1969 | Weissman. | |
| 3,602,034 | 8/1971 | Powell | 73/2 |
| 3,626,766 | 12/1971 | Waldecker | 73/2 |
| 3,940,978 | 3/1976 | Akkerman et al. | 73/117 |
| 4,070,901 | 1/1978 | McDonald | 73/2 |
| 4,185,489 | 1/1980 | Sullivan, Jr. | 73/2 |
| 4,840,437 | 6/1989 | Henry et al. | 305/10 |
| 5,010,763 | 4/1991 | Schneider | 73/117 |
| 5,027,640 | 7/1991 | Hinckley et al. | 73/2 |
| 5,040,407 | 8/1991 | Hinckley et al. | 73/2 |
| 5,148,703 | 9/1992 | Vaughan et al. | 73/123 |
| 5,269,179 | 12/1993 | Vattakattu et al. | 73/117 |
| 5,445,013 | 8/1995 | Clayton, Jr. et al. | 73/117 |
| 5,452,607 | 9/1995 | Axtell | 73/123 |

OTHER PUBLICATIONS

"Inductor Speedometer/Odometer Testing System Installation and Operating Instructions", Inductor Division Frank L. Wells Company.

*Primary Examiner*—Hezron E. Williams
*Assistant Examiner*—Helen C. Kwok
*Attorney, Agent, or Firm*—Paul S. Rooy

[57] ABSTRACT

A mobile speedometer tester comprising at least two main wheels rotatably attached to a trailer frame, and a trailer frame. A target disk, pickup and totalizer measure the rate of roller rotation, and bellcranks rotatably mounted to the trailer frame allow the main wheels to be extended and retracted. A brake is provided to stop the rollers from rotating, and the front wheel is retractable by means of an electric motor. The main wheels are quickly and easily removable from the bellcranks. Ramps attached to the trailer frame allow test vehicles to drive up onto the mobile speedometer tester in order to test their speedometers. A motorcycle version allows motorcycle speedometers to be tested. The motorcycle version includes an engine rotatably attached to the trailer frame, an engine drive wheel which imparts rotary motion to one roller, an engine jack to bring the engine drive wheel in and out of contact with a roller, and an auxiliary control panel which allows the motorcycle speedometer test operator to start the engine, and to brake the roller to a halt. An alternate embodiment provides a dynamometer for measuring torque imparted to the rollers by a test vehicle.

29 Claims, 7 Drawing Sheets

MOBILE SPEEDOMETER TESTER

BACKGROUND OF THE INVENTION

1. Field of the Invention

This invention relates to speedometer testers and calibration devices, and in particular to a mobile speedometer tester.

2. Background of the Invention

Speedometers are speed indicators which display the rate at which a vehicle is traveling. These devices are standard equipment on land vehicles such as cars, trucks and motorcycles. Speedometers are important in that they allow vehicle operators to control their speed fairly accurately for purposes of fuel economy, compliance with the applicable speed limit, etc. Officially calibrated speedometers installed on official vehicles such as police cars may be used to check the speed of other motorists, and used as a basis for issuing speeding citations. For that reason, police speedometers must be regularly tested. In addition, speedometers mounted on non-official vehicles may periodically require testing.

3. Existing Designs

Over the years, a number of approaches have been taken toward developing speedometer testers. U.S. Pat. Nos. 2,607,212, 2,781,659 and 3,178,927 were granted for in-floor speedometer testers. These designs comprised two pairs of parallel rollers embedded in the floor of the testing facility. The drive wheels of the vehicle to be tested were positioned between the pairs of rollers so as to be supported by the rollers. Any rotational movement of the drive wheels would impart a corresponding rotational movement to the drive wheel support rollers. The vehicle's drive wheels were then accelerated to the different speeds at which the speedometer was to be checked, and the roller speed measurement where the roller diameter was accurately known, the drive wheel rim speed could be tellably measured, and compared against the vehicle speedometer reading.

Problems associated with this in-floor type of speedometer tester design included heavy and cumbersome equipment, expensive, permanent installations, and lack of transportability of the testing apparatus. This last disadvantage was especially onerous: all vehicles to be tested had to be driven to the testing facility to have their speedometers checked. Where an entire police department's vehicles had to be tested, this procedure resulted in considerable wastage of man hours driving to and from the testing facility. This could be expensive where the police officers had to do the driving. Finally, no provisions were made to test motorcycle speedometers. This is a non-trivial problem, because motorcycle speedometers are typically mounted on a different wheel from the drive wheel—generally a motorcycle's rear wheel is the drive wheel, while the motorcycle speedometer sensor is connected to the motorcycle front wheel. Therefore, an independent means to impart rotational motion to the wheel connected to the motorcycle speedometer is required.

Attempts to solve the transportability problem have met with varying degrees of success. U.S. Pat. Nos. 3,435,657 and 4,185,489 were granted for transportable speedometer testers which could be attached to a vehicle drive wheel. Tho drive wheel was then jacked off the floor and accelerated to the different speeds at which the speedometer was to be checked, and the rotational speed noted. A major problem with this procedure was that the testing apparatus yielded the drive wheel rate of rotation, not the actual drive wheel rim speed. Any rim speed calculation based on the testing apparatus' rotation rate reading was therefore necessarily approximate, because the circumference of the drive wheel could only be approximated. Even small mounts of drive wheel wear would throw the results off, became tire wear reduces drive wheel circumference. Even more importantly, the circumference of a non-loadbearing wheel is greater than the circumference of a wheel beating a quarter of the weight of a car (around 800–1000 lbs.), became the air within a loadbearing tire will compress, reducing wheel circumference.

A third type of speedometer tester required the disconnection of the vehicle speedometer drive cable from the speedometer to be tested, and the attachment of the tester directly to the speedometer being tested. Patents representative of this variety of speedometer include U.S. Pat. Nos. 3,602,034, 4,070,901, 5,027,640 and 5,040,407. Some inventions even required the additional intermediate step of connecting a ratiometer to the vehicle speedometer and driving the vehicle a set distance, in order to calibrate the testing apparatus Disconnection of the test vehicle speedometer involved getting behind the test vehicle dashboard. In some cases the test vehicle dashboard had to actually be removed—a laborious process. Disadvantages associated with this type of speedometer testing include increased complexity and time, and consequently higher cost In addition, whenever a procedure as complex as disassembling a dashboard, breaking the seal on a speedometer drive cable, and disconnecting the speedometer is undertaken, a certain amount of breakage risk is necessarily assumed. This increased risk further augments the cost of such testing. Finally, different shares have different laws regarding the circumstances under which a speedometer seal may be broken, which agencies are authorized to so do, and what procedures must be followed to reseal the speedometer. These regulations further inflate the cost of any speedometer testing procedure which calls for the speedometer in question to be disconnected.

SUMMARY OF THE INVENTION

Accordingly, it is an object of the present invention to provide a mobile speedometer tester which may be easily moved to the test site. Design features allowing this object to be accomplished include main wheels attached to bellows-actuated bellcranks, an adjustable-height front wheel, and a trailer hitch. Advantages associated with the accomplishment of this object include reduced time spent in transmit to a permanent test installation, and consequent cost savings.

It is another object of the present invention to provide a mobile speedometer tester which tests wheel rim speed, not wheel rate of rotation. Design features allowing this object to be accomplished include rollers, a target disc attached to one of the rollers, a pickup, and a totalizer. A benefit associated with the accomplishment of this object is increased accuracy.

It is another object of this invention to provide a mobile speedometer tester which is easy and quick to set up and tear down. Design features enabling the accomplishment of this object include retractable main wheels removably attached to bellows-actuated bellcranks by means of pins, an adjustable-height from wheel, and a trailer hitch. Advantages associated with the realization of this object include saved time and money.

It is still another object of this invention to provide a mobile speedometer tester capable of testing motorcycle speedometers. Design features allowing this object to be achieved include a motorcycle support plate, an engine, an engine drive wheel in contact with a roller, an engine drive wheel attached to the engine output, a gas pedal attached to the engine, and an auxiliary control panel. Benefits associated with reaching this objective include the ability to check the accuracy of motorcycle speedometers, along with the benefits attendant an accurate speedometer, such as increased safety and reduced chances of receiving speeding tickets.

It is a further object of this invention to provide a mobile speedometer tester capable of testing a speedometer without de-installing the speedometer. Features permitting this object to be accomplished include rollers, a target disc attached to at least one roller, a pickup, and a totalizer. Benefits associated with the achievement of this object include decreased complexity, less time spent testing, reduced cost, and lessened breakage risk.

BRIEF DESCRIPTION OF THE DRAWINGS

The invention, together with the other objects, features, aspects and advantages thereof will be more clearly understood from the following in conjunction with the accompanying drawings.

Seven sheets of drawings are provided. Sheet one contains FIGS. 1 and 2. Sheet two contains FIG. 3. Sheet three contains FIG. 4. Sheet four contains FIG. 5. Sheet five contains FIGS. 6 and 7. Sheet six contains FIG. 8. Sheet nine contains FIGS. 9 and 10.

DETAILED DESCRIPTION OF THE PREFERRED EMBODIMENT

Figure 1:
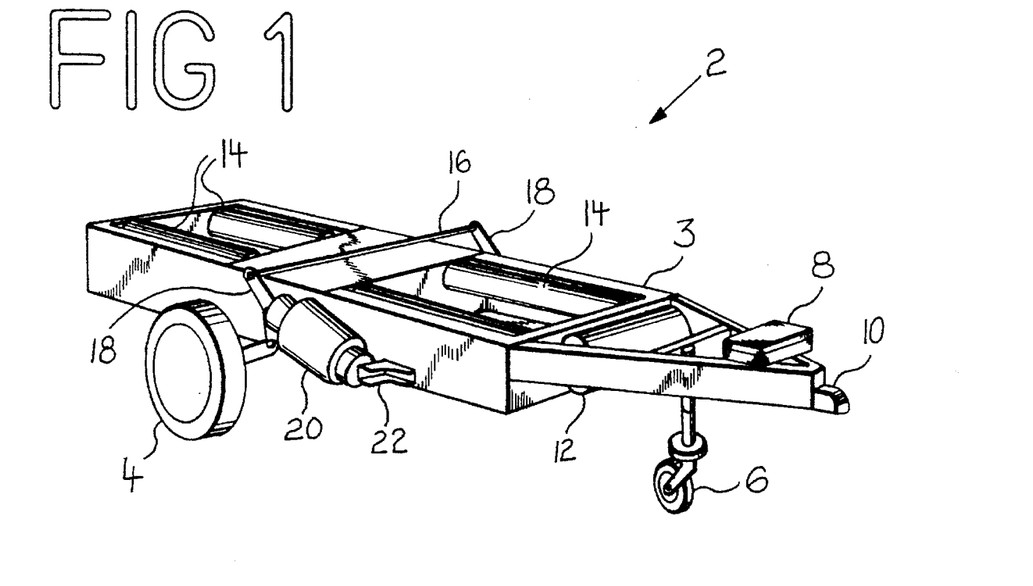
FIG. 1 is a front quarter isometric view of a mobile speedometer tester 2 with main wheels 4 and front wheel 6 in the extended position, ready for transportation.

FIG. 1 is a front quarter isometric view of a mobile speedometer tester 2 with main wheels 4 and front wheel 6 in the extended position, ready for transportation. Mobile speedometer tester 2 comprises trailer frame 3, rollers 14 rotatably mounted within trailer frame 3, main wheels 4 rotatably attached to bellcranks 18, and front wheel 6 extendibly attached to trailer frame 3. Bellcrank rod 16 connects bellcranks 18. Bellcrank rod 16 not only serves to help maintain bellcranks 18 at the same angular orientation relative to each other, but also acts as an anti-sway device, helping prevent trailer instability while under tow. Main control panel 8, trailer hitch 10, and compressed air tank 12 are mounted at the front of trailer frame 3. To tow mobile speedometer tester 2, simply lower trailer hitch 10 onto a tow vehicle tow ball by retracting front wheel 6. In the preferred embodiment, front wheel 6 was extended and retracted by a commercially available electric front wheel jack motor.

Figure 2:
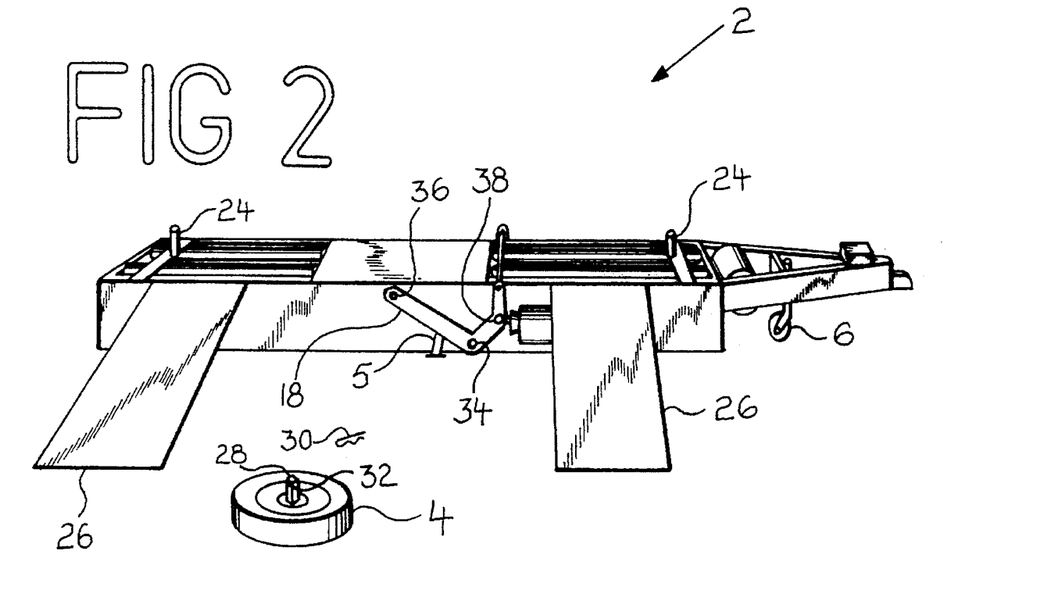
FIG. 2 is a side isometric view of a mobile speedometer tester 2 with main wheels 4 retracted and removed, and front wheel 6 in the retracted position, ready for speedometer testing of a four wheeled vehicle.

FIG. 2 is a side isometric view of a mobile speedometer tester 2 with main wheels 4 retracted and removed, and front wheel 6 in the retracted position, ready for speedometer testing. Ramps 26 have been replaced so the test vehicle may ascend mobile speedometer tester 2. Side rollers 24 have been installed to keep the test vehicle from sliding from side to side while being tested.

Figure 6:
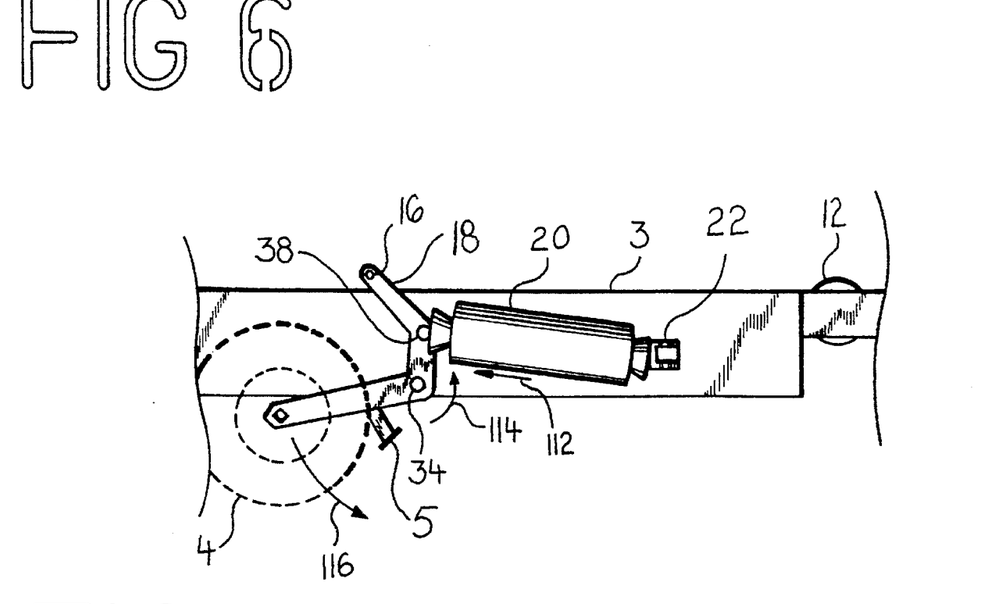
FIG. 6 is a side isometric view of main wheel 4 in the extended position.
Figure 7:
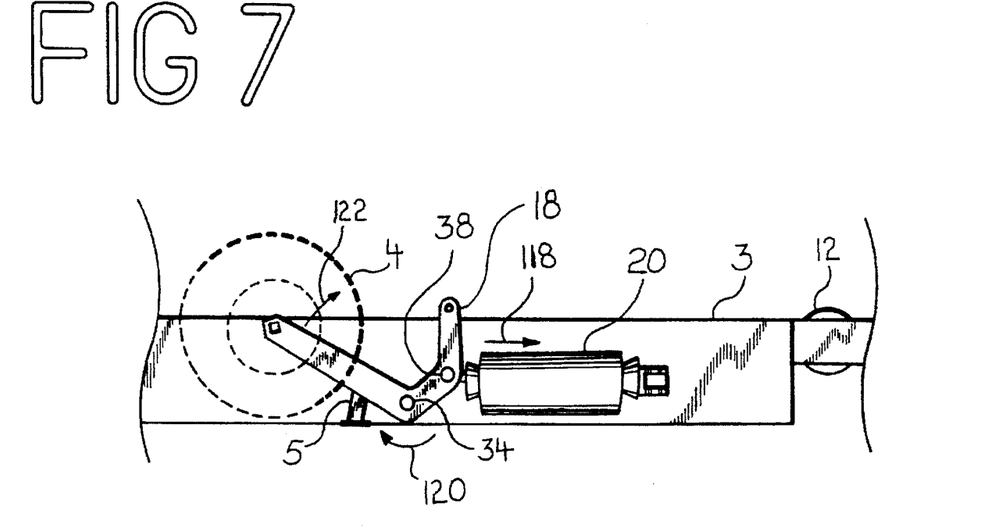
FIG. 7 is a side isometric view of main wheel 4 in the retracted position.

FIGS. 6 and 7 depict the method by which main wheels 4 are retracted and extended. FIG. 6 is a side isometric view of main wheel 4 in the extended position. Bellcrank 18 is rotatably attached to trailer frame 3 at bellcrank attach point 34. Bellows 20 is rotatably attached to trailer frame 3 at bellows bracket 22, and is rotatably attached to bellcrank 18 at bellows attach point 38. When bellows 20 is pressurized, it extends as indicated by arrow 112, causing bellcrank 18 to rotate about bellcrank attach point 34 as illustrated by arrow 114, which urges main wheel 4 into the extended position as shown by arrow 116.

FIG. 7 is a side isometric view of main wheel 4 in the retracted position when bellows 20 is de-pressurized, it retracts as indicated by arrow 118, allowing bellcrank 18 to rotate about bellcrank attach point 34 as illustrated by arrow 120, as urged by the weight of trailer frame 3 on main wheel 4. As Wailer frame 3 settles to the ground, bellcrank spur 5 forces main wheel 4 into the fully retracted position as shown by arrow 122. In the fully retracted position, main wheel 4 is not in contact with the ground, and may be easily removed from bellcrank 18 by removing pin 30 from pin hole 32, and sliding main wheel axle 28 out of bellcrank axle hole 36, as depicted in FIG. 2.

Figure 3:
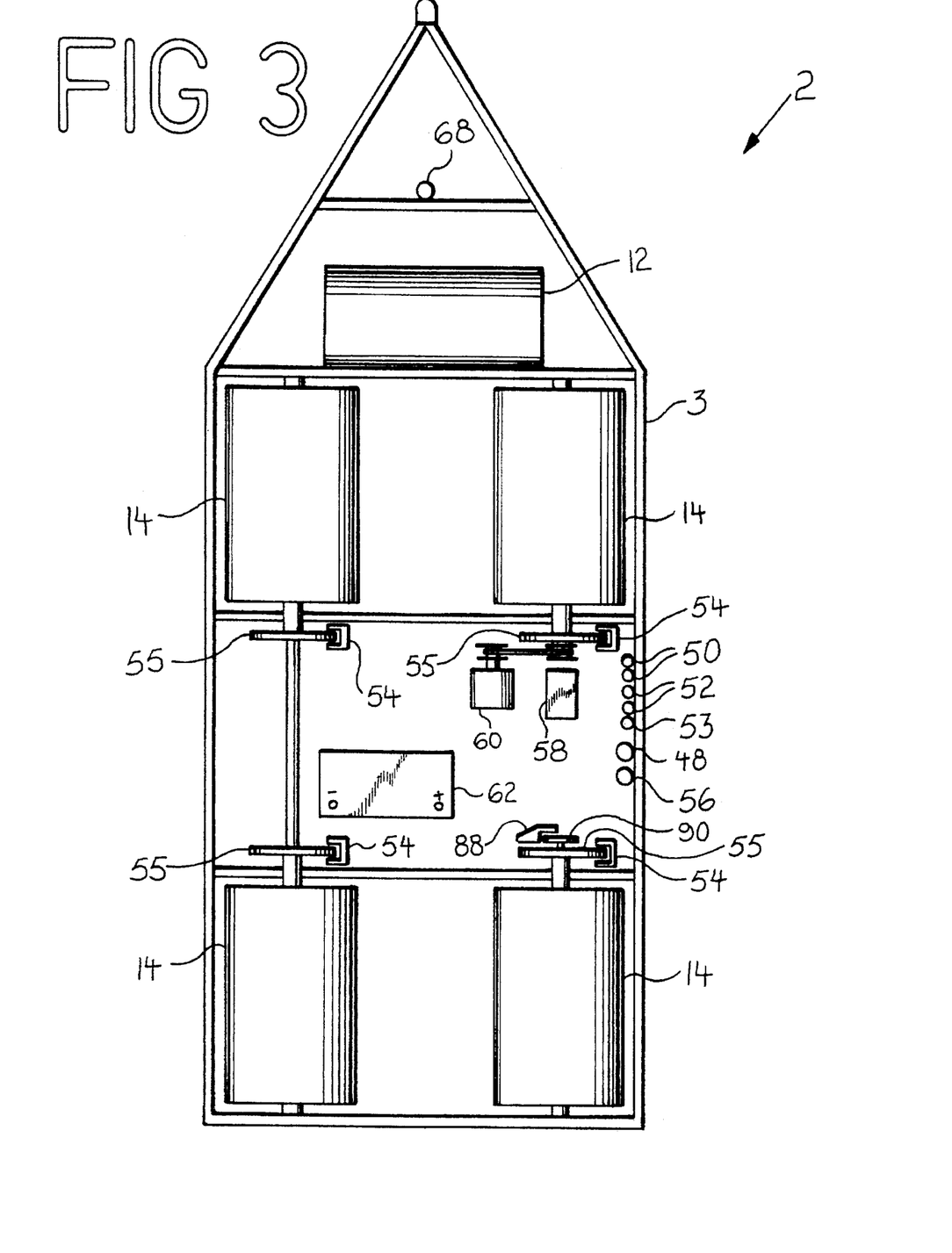
FIG. 3 is a top view of a mobile speedometer tester 2 with all major internal components visible.

FIG. 3 is a top view of a mobile speedometer tester 2 with all major components visible. Compressed air tank 12 is mounted near the front of trailer frame 3. Rollers 14 are rotatably mounted to trailer frame 3 in parallel pairs, spaced so as to rotatably support the test vehicle drive wheels. Brake discs 55 are attached to rollers 14, and brake calipers 54 grip brake discs 55 on command in order to stop rollers 14 from rotating when a test is concluded. Battery 62 serves to power electric air compressor 58, totalizer 86, and front wheel jack motor 68. Alternator 60 is turned by a roller 14, and charges battery 62. Target disc 90 is attached to a roller 14; pickup 88 detects its talc of rotation. Since the diameter of rollers 14 is precisely known, the rim speed of the test vehicle drive wheels turning rollers 14 may be accurately calculated by totalizer 86. Totalizer 86 output is then compared to the test vehicle speedometer reading, and any error in the test vehicle speedometer noted. Up solenoid valves 50, down solenoid valves 52, brake solenoid valve 53, pressure switch 48 and air filter 56 may be mounted on trailer frame 3 where convenient.

Figure 4:
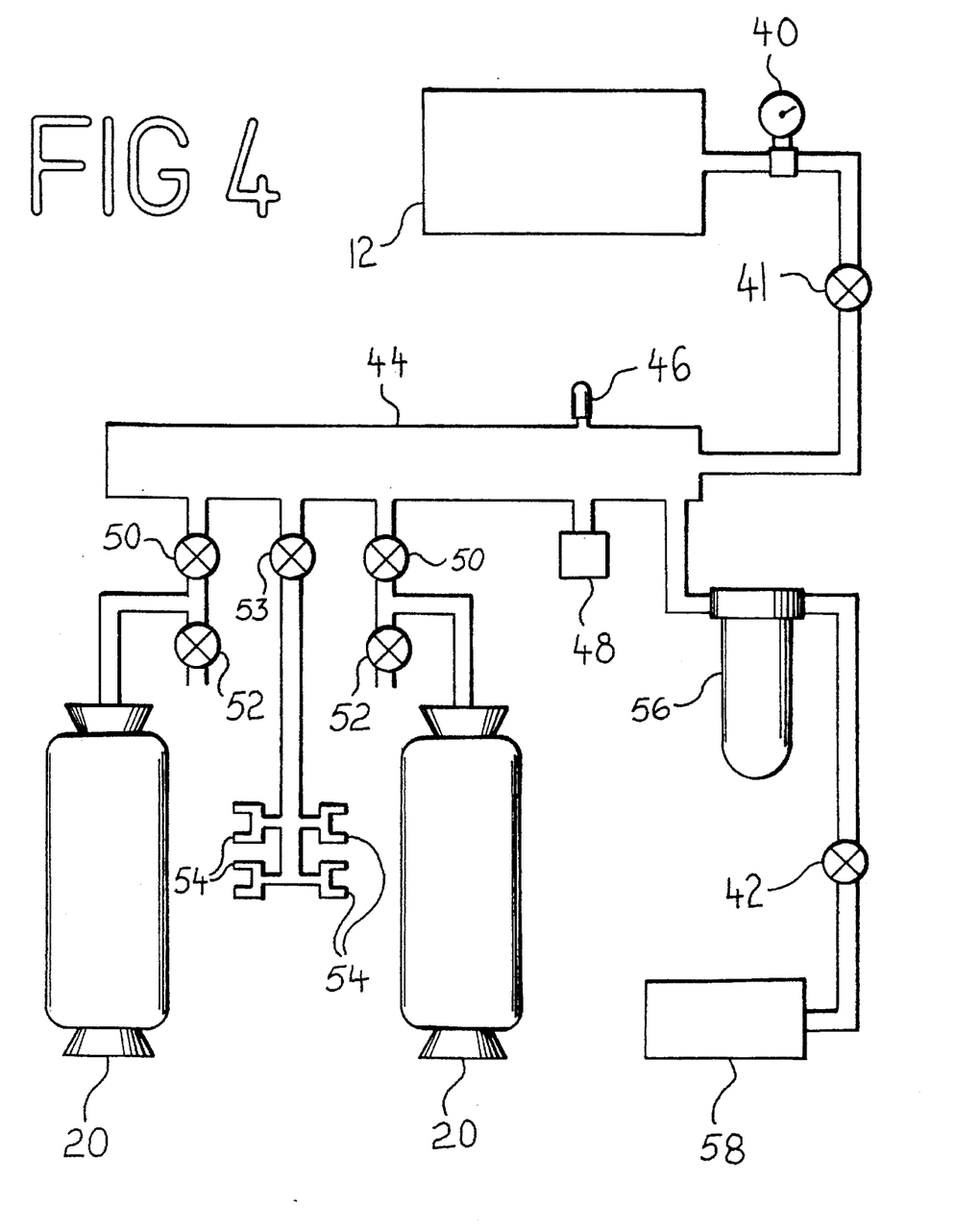
FIG. 4 is a schematic of a mobile speedometer tester 2 pneumatic system.

FIG. 4 is a schematic of a mobile speedometer tester 2 pneumatic system. Compressed air tank 12 is charged by air compressor 58 via air filter 56 and manifold 44. Pressure gage 40 indicates system pressure, and shut-off valve 41 may be closed to maintain pressure within compressed air tank 12 over extended periods of time. Check valve 42 prevents escape of air pressure through air compressor 58.

Pressure switch 48 senses when the system pressure has risen to the correct, predetermined level, and shuts off electric air compressor 58 when that pressure has been reached. Safety valve 46 opens to relieve system pressure if the pressure gets too high.

Each bellows 20 communicates with manifold 44 through an up solenoid valve 50. When main wheels 4 must be extended in order to transport mobile speedometer tester 2, up solenoid vales 50 are opened, thereby pressurizing bellows 20 and extending them. Bellows 20 extension causes bellcrank 18 to rotate about bellcrank attach points 34, which urges main wheels 4 into the extended position.

When main wheels 4 must be retracted in order to use mobile speedometer tester 2 for speedometer testing, down solenoid vales 52 are opened, thereby de-pressurizing bellows 20 and compressing their length. Bellows 20 length compression causes bellcranks 18 to rotate about bellcrank attach points 34, which allow main wheels 4 to retract. Bellows 20 are readily available commercially. In tho preferred embodiment, bellows 20 were of the type commonly used in recreational vehicle leveling systems, and in truck air ride systems.

Brake calipers 54 communicate with manifold 44 through brake solenoid valve 53. When brake solenoid valve 53 is opened, air pressure from manifold 44 causes brake calipers to grip brake discs 55 attached to rollers 14, thereby quickly braking any rotational movement of rollers 14 to a halt.

Figure 5:
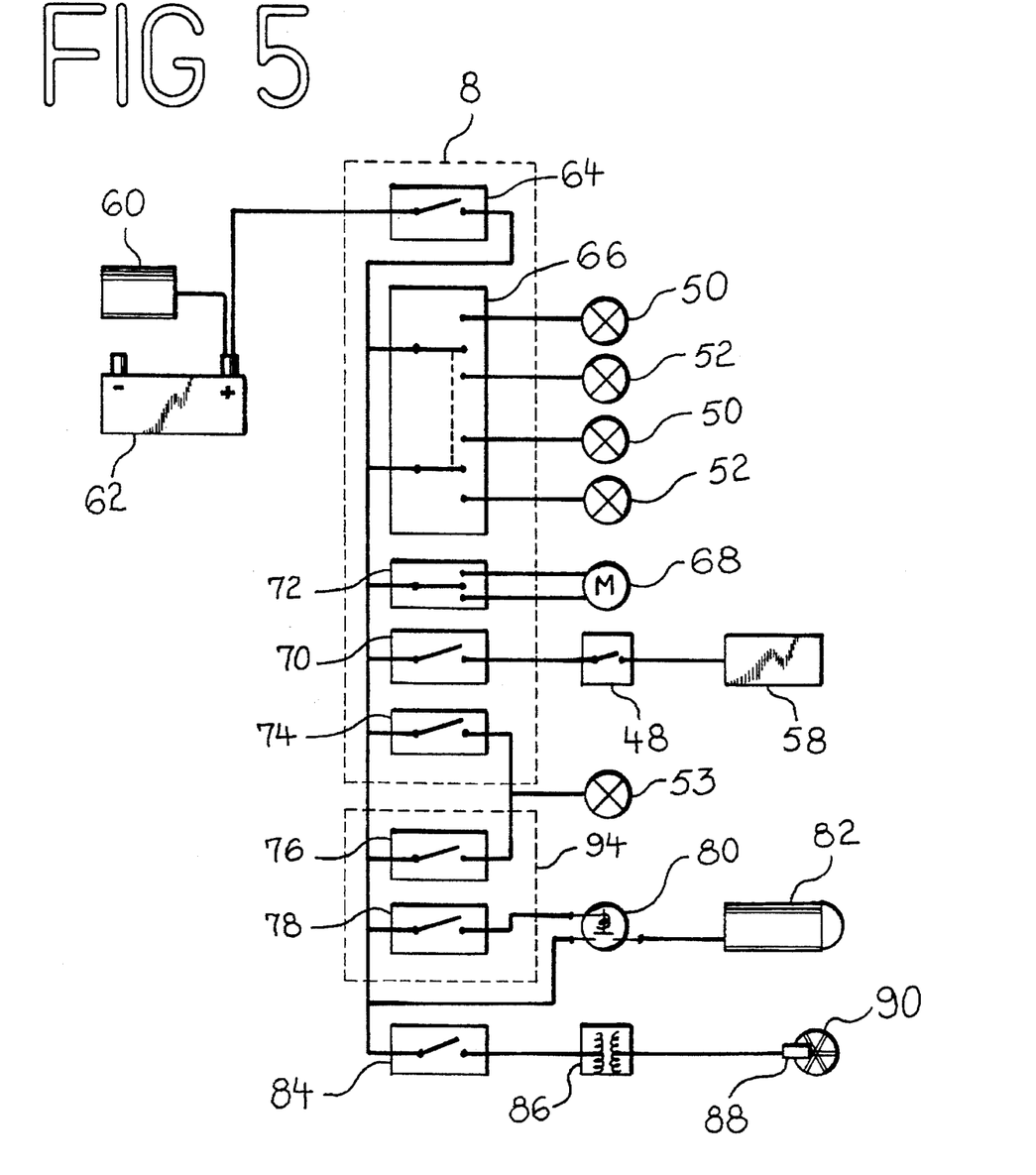
FIG. 5 is a schematic of a mobile speedometer tester 2 electrical system.

FIG. 5 is a schematic of a mobile speedometer tester 2 electrical system. Alternator 60 charges battery 62. Battery 62 is electrically connected to main control panel 8, auxiliary control panel 94, and transformer 84. Main switch 64 serves to electrically isolate battery 62 and alternator 60 from the rest of the electrical system, thereby de-energizing the remainder of the components.

Main control panel 8 comprises main switch 64, main wheels up/down rocker switch 66, front wheel up/down rocker switch 72, air compressor switch 70, and main control panel brake switch 74. Main wheels up/down rocker switch 66, front wheel up/down rocker switch 72, air compressor switch 70 and main control panel brake switch 74 are electrically connected to battery 62 through main switch 64. Main wheels up/down rocker switch 66 is a two pole rocker switch, wherein either of to pairs of terminals may be electrically connected to main switch 64. Up solenoid valves 50 are electrically connected to one pair of main wheels up/down rocker switch 66 terminals; down solenoid valves 52 are electrically connected to the other pair of main wheels up/down rocker switch 66 terminals. In the preferred embodiment, main wheels up/down rocker switch 66 was a three position switch: extend wheels (closed), centered (open), and retract wheels (closed).

Front wheel jack motor 68 is electrically connected to main switch 64 through front wheel up/down rocker switch 70. In the preferred embodiment, front wheel up/down rocker switch 70 was a single pole, three position switch: extend wheel (closed), centered (open), and retract wheel (closed).

Air compressor 58 is electrically connected to air compressor switch 70 through pressure switch 48. Brake solenoid valve 53 is electrically connected to main control panel brake switch 74.

Auxiliary control panel 94 is electrically connected to battery 62 through main switch 64, and comprises auxiliary control panel brake switch 76 and starter switch 78. Auxiliary control panel brake switch 76 and starter switch 78 are electrically connected to main switch 64.

In the preferred embodiment, main control brake switch 74 and auxiliary control panel brake switch 76 were single pole switches. The action of closing either switch opens brake solenoid valve 53 (refer here also to FIG. 4), thereby causing brake calipers 54 to grip brake discs 55. This would cease any rotary motion of rollers 14, thereby allowing a test vehicle to drive into the test position, or to exit mobile speedometer tester 2. In addition, activation of main control brake switch 74 or auxiliary control panel brake switch 76 may be used to quickly brake rollers 14 to a halt.

Starter 82 is electrically connected to starter switch 78 through starter solenoid 80. Starter 82 serves to start engine 100. In the preferred embodiment, starter switch 78 was a single polo, normally open switch. The action of closing starter switch 78 commands starter solenoid 80 to close, thereby causing starter 82 to operate, starting engine 100.

Target disc 90 is attached to one of the rollers 14. Pickup 88 senses the rate of rotation of target disc 90 (and consequently, the rate of rotation of the roller 14 to which target disc 90 is attached), and transmits that information to totalizer 86. Totalizer 86 comprises a microprocessor and an LED display. When the microprocessor is set to measure speed, it measures the frequency of rotation of target disc 90, and translates that to a speed (e.g. expressed in miles per hour), which is shown on the LED display. Totalizer 86 is powered by battery 62 through main switch 64 and transformer 84.

Totalizer 86, pickup 88, target disc 90 and transformer 84 are readily available commercial items. In the preferred embodiment, the speedometer/odometer testing system used was a Division Frank L. Wells Company Model 4163 Speedometer/Odometer Testing System, which comprised a totalizer 86, pickup 88 and target disc 90, available from Inductor Division Frank L. Wells Company, 5821 Fifth Avenue, Kenosha Wis. 53140 (414)657-0984. INDUCTOR SPEEDOMETER/ODOMETER TESTING SYSTEMS INSTALLATION AND OPERATING INSTRUCTIONS (STS-2/92, Inductor Division Frank L. Wells Company) is hereby incorporated by reference.

Figure 8:
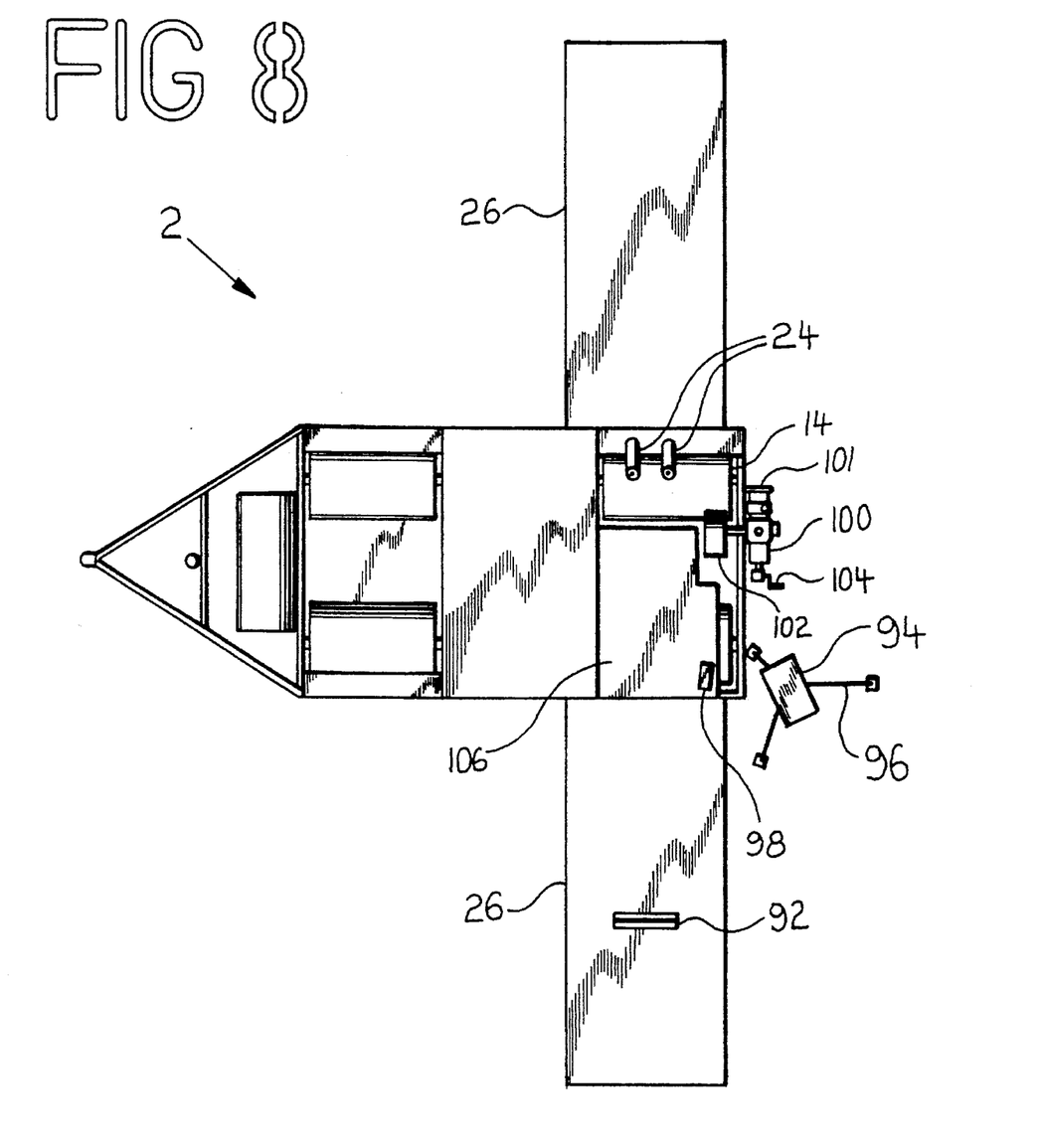
FIG. 8 is a top view of a mobile speedometer tester 2 in the motorcycle test configuration, with motorcycle support plate 106, auxiliary control panel 94, and engine 100 in position.
Figure 9:
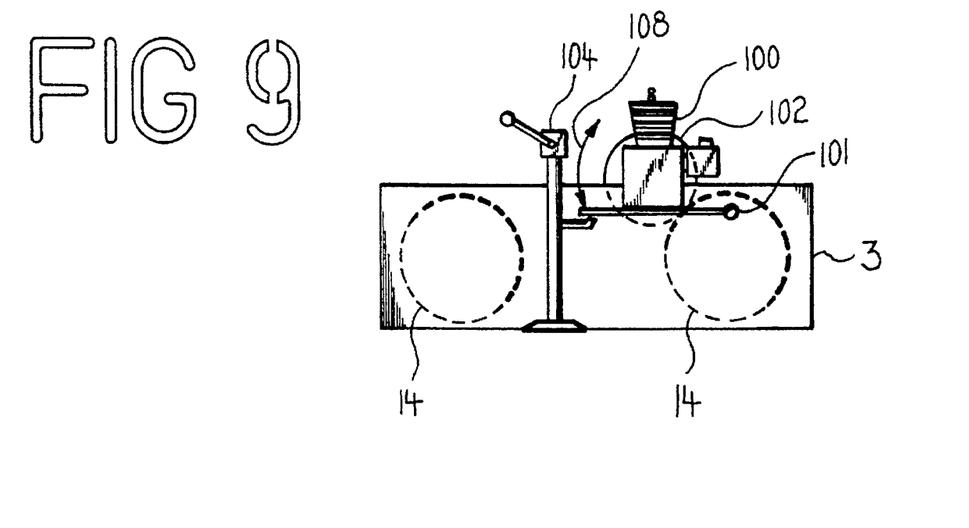
FIG. 9 is a rear view of a mobile speedometer tester 2 with engine 100 in position, driving roller 14.

FIG. 8 is a top view of a mobile speedometer tester 2 in the motorcycle test configuration, with motorcycle support plate 106, auxiliary control panel 94, and engine 100 in position. FIG. 9 is a rear view of a mobile speedometer tester 2 with engine 100 in position driving roller 14. Motorcycle support plate 106 has been emplaced in order to allow a motorcycle to be driven into position to be tested. Stop 92 holds motorcycle rear wheel 109 in place on ramp 26 against the pull of gravity, and gas pedal 98 controls engine 100 speed. Auxiliary control panel 94 is mounted on tripod 96, within easy access of a motorcycle 110 operator. Side rollers 24 have been installed to prevent motorcycle front wheel 111 from moving out of position to the side.

Engine 100 is rotatably attached to trailer frame 3 at engine attach point 101. Engine jack 104 raises or lowers engine 100 as indicated by arrow 108. Engine drive wheel 102 is attached to the output of engine 100. In the preferred embodiment, engine drive wheel 102 was a small pneumatic wheel, such as a go-cart wheel.

Engine 100 may be lowered by engine jack 104 until engine drive wheel 102 is in contact with roller 14, at which point engine drive wheel 102 will cause roller 14 to commence rotation. Gas pedal 98 controls engine 100 speed, and consequently the speed of rotation of engine drive wheel 102 and the roller 14 it drives, and therefore the rim speed of any motorcycle front wheel 111 in contact with the roller 14 driven by engine drive wheel 102. When the test is over, and it is desired to cease the rotation of the roller 14 driven by engine drive wheel 102, engine jack 104 is used to raise engine 100 until engine drive wheel 102 is no longer in contact with roller 14, and then auxiliary control panel brake switch 76 may be closed. Engine 100 may be a small, two-stroke internal combustion gas engine. In the preferred embodiment, engine 100 was a two stroke internal combustion gasoline go-cart engine.

Figure 10:
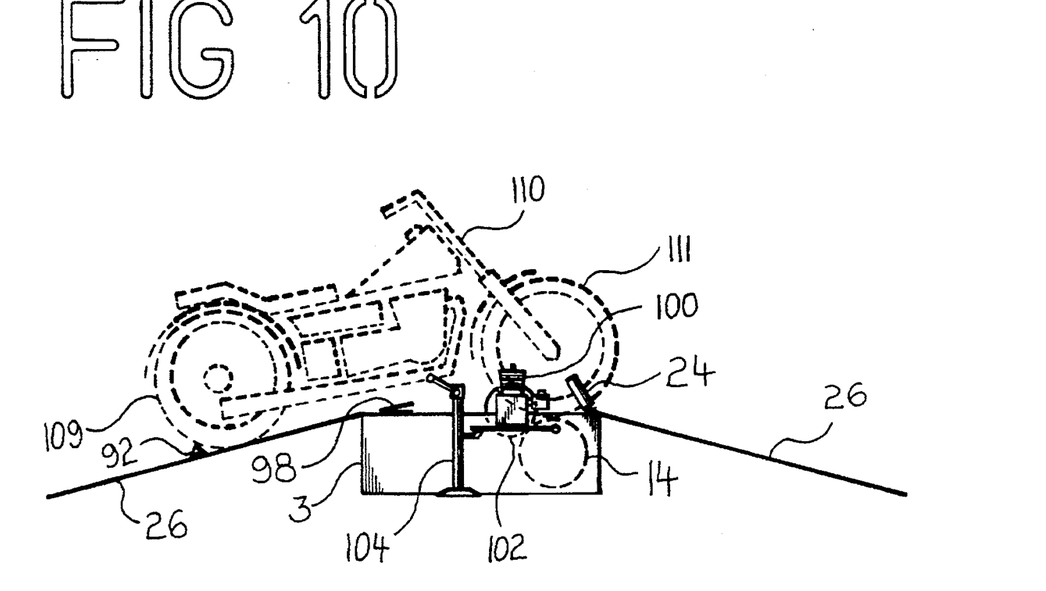
FIG. 10 is a rear view of a mobile speedometer tester 2 engaged in testing a motorcycle speedometer, with engine 100 in position driving roller 14.

FIG. 10 is a rear view of a mobile speedometer tester 2 engaged in testing a motorcycle speedometer, with engine 100 in position driving roller 14. Stop 92 holds motorcycle rear wheel 109 in place on ramp 26 against the pull of gravity, and gas pedal 98 controls engine 100 speed. Auxiliary control panel 94 is mounted on tripod 96, within easy access of a motorcycle 110 operator, and side rollers 24 have been installed to prevent motorcycle front wheel 111 from moving out of position to the side. The roller 14 driven by engine drive wheel 102 is the sole means of support of motorcycle front wheel 111. Consequently, gas pedal 98 controls the rim speed of motorcycle front wheel 111.

In an alternate embodiment of the invention, a torque meter is connected to rollers 14, and used to measure the horsepower developed by the test vehicle drive wheels.

Operation - Testing Four Wheeled Vehicle Speedometers

1. Mobile speedometer tester 2 is pulled to the test site by an appropriate tow vehicle.

2. Front wheel 6 is extended by activating front wheel up/down rocker switch 72 until trailer hitch 10 disengages up off of the tow vehicle tow ball.

3. Mobile speedometer tester 2 is positioned as desired for the testing.

4. Trailer frame 3 is lowered onto the ground by simultaneously activating main wheels up/down rocker switch 66 and front wheel up/down rocker switch 72 until trailer frame 3 rests on the ground and main wheels 4 am not touching the ground, as forced by bellcrank spur 5.

5. Pins 30 are removed from pin holes 32, and main wheels 4 are removed by sliding main wheel axles 28 out from bellcrank axle holes 36.

6. Ramps 26 and side rollers 24 are emplaced.

7. Turn on main switch 64.

8. Close main control panel brake switch 74 to prevent rollers 14 from rotating.

9. Drive a test vehicle up ramps 26 and across rollers 14, drive wheels first, until the test vehicle drive wheels are centered between parallel pairs of rollers 14, and supported only by rollers 14.

10. Chock the test vehicle non-drive wheels, to prevent the test vehicle from moving forwards or backwards during the speedometer test.

11. Place totalizer 86 on tho dashboard of the test vehicle.

12. Accelerate the test vehicle to the desired test speeds (e.g. 15, 30, 45, 60, 75 and 90 MPB), and at each test speed, record the test vehicle speedometer reading and the totalizer 86 LED readout.

14. At the conclusion of the test, allow the test vehicle drive wheels to slow to idle and use main control panel brake switch 74 or auxiliary control panel brake switch 76 to bring rollers 14 to a halt and set brake calipers 54.

15. Un-chock the test vehicle non-drive wheels, and drive the test vehicle off mobile speedometer tester 2, reversing the path it took onto mobile speedometer tester 2. Mobile speedometer tester 2 is now ready to test the next test vehicle.

16. When all test vehicles at a given location have been tested, reverse steps 2–7 of this section, and mobile speedometer tester 2 is ready to transport to the next location.

Operation - Testing Motorcycle Speedometers

1. Repeat steps 1–8 of the Operation - Testing Four Wheeled Vehicle Speedometers section.

2. Install stop 92, engine 100 and engine jack 104, gas pedal 98, and auxiliary control panel 94 on tripod 96, making sure engine 100 is raised far enough up by engine jack 104 so that engine drive wheel 102 is not in contact with roller 14.

3. Position totalizer 86 on auxiliary control panel 94.

4. Drive a test motorcycle up tamp 26 and over rollers 14 until motorcycle front wheel 111 is located directly over, and supported solely by, the roller 14 driven by engine 100. Make sure stop 92 is placed so as to maintain the test motorcycle in this position.

5. Start engine 100 using starter switch 78.

6. Use engine jack 104 to lower engine drive wheel 102 onto roller 14.

7. Use gas pedal 98 to accelerate the motorcycle front wheel 11 to the desired test speeds (e.g. 15, 30, 45, 60, 75 and 90 MPH), and at each test speed, record the test motorcycle speedometer reading and the associated totalizer 86 LED readout.

8. At the conclusion of the test, allow engine drive wheel 102 to slow to idle, use engine jack 104 to raise engine drive wheel 102 off roller 14, and use auxiliary control panel brake switch 76 to bring the roller 14 that was driven by engine drive wheel 102 to a halt.

9. Drive the test motorcycle off mobile speedometer tester 2, reversing the path it took onto mobile speedometer tester 2. Mobile speedometer tester 2 is now ready to test the next test motorcycle.

10. When all test motorcycles at a given location have been tested, reverse steps 1–3 of this section, and mobile speedometer tester 2 is ready to transport to the next location.

In the preferred embodiment, most components of mobile speedometer tester 2 were fabricated of steel. Switches, solenoid valves, starter solenoid 80, air falter 56, and the disc brakes were standard, commercially available items. Battery 62, alternator 60 and engine jack 104 were standard, commercially available automotive equipment. Air compressor 58 was a commercially available electric compressor; compressed air tank 12, pressure switch 48, pressure gage 40, safety valve 46, check valve 42 and shut-off valve 41 were commercially available pneumatic equipment.

While a preferred embodiment of the invention has been illustrated herein, it is to be understood that changes and variations may be made by those skilled in the art without departing from the spirit of the appending claims.

DRAWING ITEM INDEX 2 mobile speedometer tester
3 trailer frame
4 main wheel
5 bellcrank spur
6 front wheel 8 main control panel
10 trailer hitch
12 air tank
14 roller
16 bellcrank rod
18 bellcrank
20 bellows
22 bellows bracket
24 side roller
26 ramp
28 main wheel axle
30 pin
32 pin hole
34 bellcrank attach point
36 bellcrank axle hole
38 bellows attach point
40 pressure gage
41 shut-off valve
42 check valve
44 manifold
46 safety valve
48 pressure switch
50 up solenoid valve
52 down solenoid valve
53 brake solenoid valve
54 brake caliper
55 brake disc
56 air filter
58 air compressor
60 alternator
62 battery
64 main switch
66 main wheels up/down rocker switch
68 front wheel jack motor
70 air compressor switch
72 front wheel up/down rocker switch
74 main control panel brake switch
76 auxiliary control panel brake switch
78 starter switch
80 starter solenoid
82 starter
84 transformer
86 totalizer
88 pickup
90 target disc
92 stop
94 auxiliary control panel
96 tripod
98 gas pedal
100 engine
101 engine attach point
102 engine drive wheel
104 engine jack
106 motorcycle support plate
108 arrow
109 motorcycle rear wheel
110 motorcycle
111 motorcycle front wheel
112 arrow
114 arrow
116 arrow
118 arrow
120 arrow
122 arrow

I claim:

1. A mobile speedometer tester comprising:
a trailer frame comprising at least two main wheels;
at least one roller rotatably mounted to said trailer frame;
a means of measuring the rate of rotation of said roller; and
a means to retract and extend said main wheels comprising a bellcrank rotatably attached to each said main wheel, each said main wheel being attached to one end of one said bellcrank at a bellcrank axle hole, bellows being rotatably attached to another end of said bellcrank at a bellows attach point, one end of each said bellows being attached to said bellcrank and another end of each said bellows being attached to said trailer frame, said bellcrank comprising a spur leg and a bellows leg, an extreme of one said spur leg being rigidly attached to an extreme of said bellows leg at an approximately right angle at a leg intersection, said bellcrank being rotatably attached to said trailer frame at a bellcrank attach point disposed at said leg intersection, whereby said bellcrank may rotate relative to said frame about said bellcrank attach point, said bellcrank axle hole being disposed at an extreme of said spur leg opposite said leg intersection, said bellows attach point being disposed on said bellows leg.

2. The mobile speedometer tester of claim 1 further comprising a bellcrank spur rigidly attached to said spur leg at an approximately right angle, a length of said bellcrank spur being greater than a distance between said bellcrank attach point and a lower edge of said trailer frame, whereby said main wheels are forced out of contact with the ground to facilitate quick and easy wheel removal and replacement when said wheels are fully retracted.

3. The mobile speedometer tester of claim 1 further comprising a bellcrank rod rigidly connecting at least one pair of said bellcranks, said bellcrank rod being attached to said bellcranks at an end of each said bellcrank at which said bellows attach point is disposed.

4. The mobile speedometer tester of claim 1 further comprising a means of quickly and easily removing said main wheels from said trailer frame.

5. The mobile speedometer tester of claim 4 wherein said means of quickly and easily removing said main wheels from said trailer frame comprises bellcranks attached to said trailer frame, a bellcrank axle hole disposed in each said bellcrank, a main wheel axle rotatably attached to each said main wheel, each said main wheel axle being sized to fit in the bellcrank axle holes, a pin hole in each said main wheel axle, and a pin sized to fit in each of the pin holes.

6. The mobile speedometer tester of claim 1 further comprising a front wheel attached to said trailer frame.

7. The mobile speedometer tester of claim 6 further comprising a means to extend and retract said front wheel.

8. The mobile speedometer tester of claim 7 wherein said means to extend and retract said front wheel comprises an electric front wheel jack motor.

9. The mobile speedometer tester of claim 4 further comprising a trailer hitch attached to said trailer frame.

10. The mobile speedometer tester of claim 4 further comprising a means to brake rotary motion of said at least one roller, whereby said at least one roller may be immobilized, so that a vehicle being tested may be driven off said mobile speedometer tester.

11. The mobile speedometer tester of claim 1 further comprising a manifold communicating with an air compressor, and communicating with each said bellows through an up solenoid valve, whereby said bellows may be pressurized to extend said main wheels.

12. The mobile speedometer tester of claim 11 further comprising a down solenoid valve communicating with each said bellows, whereby said bellows may be decompressed to retract said main wheels.

13. The mobile speedometer tester of claim 10 wherein said braking means comprises a manifold communicating with an air compressor, and communicating with brake calipers through a brake solenoid valve, a brake disc within each said caliper, one said brake disc being attached to each said rollers.

14. The mobile speedometer tester of claim 12 further comprising:

a compressed air tank communicating with said manifold; and a pressure switch communicating with said manifold, said pressure switch being electrically connected to said air compressor, whereby said air compressor may be automatically turned off when a pre-determined pressure is achieved within said manifold.

15. The mobile speedometer tester of claim 12 further comprising a battery, an alternator electrically connected to said battery, and a main control panel electrically connected to said battery.

16. The mobile speedometer tester of claim 15 wherein said main control panel comprises;

a main switch electrically connected to said battery;

a main wheels up/down rocker switch electrically connected to said main switch, to the up solenoid valves, and to the down solenoid valves;

a front wheel up/down rocker switch electrically connected to said main switch, and to a front wheel jack motor; and an air compressor switch electrically connected to said main switch and to said air compressor.

17. The mobile speedometer tester of claim 16 wherein said means of measuring the rate of rotation of said roller comprises a target disc attached to one said roller, a pickup disposed near said target disc, and a totalizer electrically connected to said pickup, said totalizer being electrically connected to said main switch.

18. The mobile speedometer tester of claim 17 further comprising brake calipers communicating with said manifold through a brake solenoid valve, and a brake disc within each said caliper, one said brake disc being attached to each said at least one roller, said brake solenoid valve being electrically connected to said main switch through a main control panel brake switch.

19. The mobile speedometer tester of claim 16 further comprising an engine rotatably attached to said trailer frame, an engine drive wheel attached to the output of said engine, the distance between said engine drive wheel and one said roller being determined by an engine jack upon which said engine depends, whereby one said roller may be driven by said engine drive wheel.

20. The mobile speedometer tester of claim 19 further comprising an auxiliary control panel electrically connected to said main switch, said auxiliary control panel comprising a starter switch and an auxiliary control panel brake switch, said starter switch being electrically connected to a starter, whereby said engine may be started, said auxiliary control panel brake switch being electrically connected to a brake solenoid valve where through said manifold communicates with brake calipers around brake discs, one said brake disc being attached to each said roller, whereby said at least one roller may be immobilized.

21. A mobile speedometer tester comprising:

a trailer frame comprising at least two main wheels;

at least one roller rotatably mounted to said trailer frame;

a means of measuring the rate of rotation of said roller; and an engine rotatably attached to said trailer frame, an engine drive wheel attached to the output of said engine, the distance between said engine drive wheel and one said roller being determined by an engine jack upon which said engine depends, whereby a motorcycle speedometer engaged with the front wheel of a motorcycle may be calibrated.

22. A mobile speedometer tester comprising:

at least two main wheels rotatably attached to a trailer frame and at least one roller rotatably mounted to said trailer frame;

a means of measuring the rate of rotation of said roller;

a means to extend and retract said main wheels comprising a bellcrank rotatably attached to each said main wheel, each said main wheel being attached to one end of one said bellcrank at a bellcrank axle hole, bellows being rotatably attached to another end of said bellcrank at a bellows attach point, one end of each said bellows being attached to said bellcrank and another end of each said bellows being attached to said trailer frame, said bellcrank comprising a spur leg and a bellows leg, an extreme of one said spur leg being rigidly attached to an extreme of said bellows leg at an approximately right angle at a leg intersection, said bellcrank being rotatably attached to said trailer frame at a bellcrank attach point disposed at said leg intersection, whereby said bellcrank may rotate relative to said frame about said bellcrank attach point, said bellcrank axle hole being disposed at an extreme of said spur leg opposite said leg intersection, said bellows attach point being disposed on said bellows leg;

a means of quickly and easily removing said main wheels; and a means of braking said at least one roller, whereby said at least one roller may be immobilized, so that a vehicle being tested may be driven off said mobile speedometer tester.

23. The mobile speedometer tester of claim 22 further comprising:

a manifold communicating with an air compressor, and communicating with each said bellows through an up solenoid valve, whereby said bellows may be pressurized to extend said main wheels; and a down solenoid valve communicating with each said bellows, whereby said bellows may be decompressed to retract said main wheels.

24. A mobile speedometer tester comprising:

at least two main wheels rotatably attached to a trailer frame and at least one roller rotatably mounted to said trailer frame;

a means of measuring the rate of rotation of said roller;

a means to extend and retract said main wheels;

a means of quickly and easily removing said main wheels comprising bellcranks attached to said trailer frame, a bellcrank axle hole disposed in each said bellcrank, a main wheel axle rotatably attached to each said main wheel, each said main wheel axle being sized to fit in the bellcrank axle holes, a pin hole in each said main wheel axle, and a pin sized to fit in each of the pin holes; and a means of braking said at least one roller, whereby said at least one roller may be immobilized, so that a vehicle being tested may be driven off said mobile speedometer tester.

25. A mobile speedometer tester comprising:

at least two main wheels rotatably attached to a trailer frame and at least one roller rotatably mounted to said trailer frame;

a means of measuring the rate of rotation of said roller;

a means to extend and retract said main wheels;

a meaning of quickly and easily removing said main wheels; and a means of braking said at least one roller comprising a manifold communicating with an air compressor, and communicating with brake calipers through a brake solenoid valve, a brake disc within each said brake caliper, one said brake disc being attached to each at least one said roller, whereby said at least one roller may be immobilized, so that a vehicle may be driven off said mobile speedometer tester after being tested.

26. A mobile speedometer tester comprising:

at least two main wheels rotatably attached to a trailer frame and at least one roller rotatably mounted to said trailer frame;

a means of measuring the rate of rotation of said roller;

a means to extend and retract said main wheels;

a means of quickly and easily removing said main wheels;

a means of braking said at least one roller, whereby said at least one roller may be immobilized, so that a vehicle being tested may be driven off said mobile speedometer tester; and an engine rotatably attached to said trailer frame, an engine drive wheel attached to the output of said engine, the distance between said engine drive wheel and one said roller being determined by an engine jack upon which said engine depends, whereby one said roller may be driven by said engine drive wheel.

27. The mobile speedometer tester of claim 26 further comprising an auxiliary control panel electrically connected to a battery through a main switch, said auxiliary control panel comprising a starter switch and an auxiliary control panel brake switch, said starter switch being electrically connected to a starter, whereby said engine may be started, said auxiliary control panel brake switch being electrically connected to a brake solenoid valve where through a manifold communicates with brake calipers around brake discs, one said brake disc being attached to each said at least one roller, whereby said rollers may be immobilized.

28. The mobile speedometer tester of claim 27 further comprising at least one ramp, a motorcycle support plate and at least two side rollers attached to said trailer frame.

29. A mobile speedometer tester comprising:

at least two main wheels rotatably attached to a trailer frame and at least one roller rotatably mounted to said trailer frame;

a means to extend and retract said main wheels;

a means of quickly and easily removing said main wheels comprising a bellcrank rotatably attached to each said main wheel, each said main wheel being attached to one end of one said bellcrank at a bellcrank axle hole, bellows being rotatably attached to another end of said bellcrank at a bellows attach point, one end of each said bellows being attached to said bellcrank and another end of each said bellows being attached to said trailer frame, said bellcrank comprising a spur leg and a bellows leg, an extreme of one said spur leg being rigidly attached to an extreme of said bellows leg at an approximately right angle at a leg intersection, said bellcrank being rotatably attached to said trailer frame at a bellcrank attach point disposed at said leg intersection, whereby said bellcrank may rotate relative to said frame about said bellcrank attach point, said bellcrank axle hole being disposed at an extreme of said spur leg opposite said leg intersection, said bellows attach point being disposed on said bellows leg;

a means of braking said at least one roller; and a means of measuring the torque imparted to said at least one roller by a test vehicle.

* * * * *

UNITED STATES PATENT AND TRADEMARK OFFICE
CERTIFICATE OF CORRECTION

PATENT NO. : 5,656,764  
DATED : August 12, 1997  
INVENTOR(S) : Paul Loeffler

It is certified that error appears in the above-identified patent and that said Letters Patent is hereby corrected as shown below:

Column 1, line 12, "tracks" should be --trucks--.

Column 1, line 34, "measurement" should be --measured.--.

Column 1, line 35, "where" should be --Where--.

Column 1, line 36, "tellable" should be --reliably--.

Column 1, line 61, "Tho" should be --The--.

Column 2, line 3, "mounts" should be --amounts--.

Column 2, line 4, "became" should be --because--.

Column 2, line 7, "beating" should be --bearing--.

Column 2, line 8, "became" should be --because--.

Column 2, line 20, "apparatus" should be --apparatus!--.

Column 2, line 26, "cost" should be --cost.--.

UNITED STATES PATENT AND TRADEMARK OFFICE
CERTIFICATE OF CORRECTION

PATENT NO. : 5,656,764
DATED : August 12, 1997
INVENTOR(S) : Paul Loeffler

It is certified that error appears in the above-identified patent and that said Letters Patent is hereby corrected as shown below:

Column 2, line 31, "shares" should be --states--.

Column 2, line 62, "from" should be --front--.

Column 4, line 15, "replaced" should be --emplaced--.

Column 4, line 31, "position when" should be --position. When--.

Column 4, line 35, "As Wailer..." should be --As trailer...--.

Column 4, line 54, "talc of rotation" should be --rate of rotation--.

Column 5, line 21, "tho" should be --the--.

Column 6, line 16, "single polo, normally open" should be --single pole, normally open--.

Column 7, line 59, "90 MPB" should be --90 MPH--.

Column 8, line 18, "tamp" should be --ramp--.

UNITED STATES PATENT AND TRADEMARK OFFICE
CERTIFICATE OF CORRECTION

PATENT NO. : 5,656,764
DATED : August 12, 1997
INVENTOR(S) : Paul Loeffler

It is certified that error appears in the above-identified patent and that said Letters Patent is hereby corrected as shown below:

Column 8, line 47, "air falter" should be --air filter--.

Column 10, line 66, "claim 4" should be --claim 1--.

Column 11, line 1, "claim 4" should be --claim 1--.

Column 12, line 6, "where through" should be --wherethrough--.

Column 14, line 10, "where through" should be --wherethrough--.

Signed and Sealed this

Ninth Day of December, 1997

Attest:

Attesting Officer

BRUCE LEHMAN

Commissioner of Patents and Trademarks